United States Patent
Bender et al.

(10) Patent No.: US 7,058,031 B2
(45) Date of Patent: Jun. 6, 2006

(54) METHOD AND APPARATUS FOR EFFICIENT USE OF COMMUNICATION RESOURCES IN A DATA COMMUNICATION SYSTEM UNDER OVERLOAD CONDITIONS

(75) Inventors: Paul E. Bender, San Diego, CA (US); Michael-David Nakayoshi Canoy, San Diego, CA (US); Bibhu Mohanty, San Diego, CA (US); Rajesh K. Pankaj, San Diego, CA (US); Boris S. Tsybakov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 09/773,835

(22) Filed: Jan. 31, 2001

(65) Prior Publication Data

US 2002/0101837 A1 Aug. 1, 2002

(51) Int. Cl.
*H04Q 7/00* (2006.01)
*H04J 3/14* (2006.01)
*H04I 12/00* (2006.01)

(52) U.S. Cl. ...................... 370/329; 370/435; 370/437; 370/442; 370/450; 370/461; 370/462

(58) Field of Classification Search ................ 370/229, 370/230, 230.1, 231, 232, 233, 235, 276, 370/280, 282, 294, 310, 313, 328, 329, 342, 370/412, 441, 447, 461, 462, 433, 435, 437, 370/450, 449, 454, 345
See application file for complete search history.

(56) References Cited

U.S. PATENT DOCUMENTS

| 5,488,609 | A | * | 1/1996 | Hluchyj et al. | ............. | 370/232 |
| 5,903,851 | A | * | 5/1999 | Backstrom et al. | ......... | 455/557 |
| 5,940,763 | A | * | 8/1999 | Alperovich et al. | ........ | 455/450 |
| 5,983,114 | A | * | 11/1999 | Yao et al. | ................... | 455/509 |
| 6,069,882 | A | | 5/2000 | Zellner et al. | ............. | 370/329 |
| 6,141,322 | A | | 10/2000 | Poretsky | ..................... | 370/231 |

(Continued)

FOREIGN PATENT DOCUMENTS

EP  0714192  5/1996

(Continued)

OTHER PUBLICATIONS

3 RD Generation Partnership Project 2 "3GPP2", cdma2000 High Rate Packet Data Air Interface Specification, Oct. 27, 2000.*

*Primary Examiner*—Hassan Kizou
*Assistant Examiner*—Ahmed Elallam
(74) *Attorney, Agent, or Firm*—Philip Wadsworth; Sandra L. Godsey; S. Hossain Beladi

(57) ABSTRACT

In a communication system (1400) for communication of data, a method and apparatus provide for detecting a request for opening a connection for a user (1407) for communication of data, selecting an open connection, releasing the selected open connection, and allocating, to the user (1407), communication resources corresponding to resources released based on releasing the selected open connection. In accordance with an embodiment, the selected open connection is in an idle open state.

34 Claims, 12 Drawing Sheets

U.S. PATENT DOCUMENTS

| | | | |
|---|---|---|---|
| 6,345,038 B1* | 2/2002 | Selinger | 370/230 |
| 6,353,605 B1* | 3/2002 | Rautanen et al. | 370/337 |
| 6,397,071 B1* | 5/2002 | Hussain et al. | 455/456.1 |
| 6,477,373 B1* | 11/2002 | Rappaport et al. | 455/436 |
| 6,539,030 B1* | 3/2003 | Bender et al. | 370/469 |
| 6,542,739 B1* | 4/2003 | Garner | 455/427 |
| 6,598,082 B1* | 7/2003 | Douglis et al. | 709/227 |
| 6,643,262 B1* | 11/2003 | Larsson et al. | 370/236 |
| 6,674,713 B1* | 1/2004 | Berg et al. | 370/217 |
| 6,826,160 B1* | 11/2004 | Wang et al. | 370/329 |
| 2002/0068570 A1* | 6/2002 | Abrol et al. | 455/438 |
| 2005/0117576 A1* | 6/2005 | McDysan et al. | 370/389 |

FOREIGN PATENT DOCUMENTS

| | | |
|---|---|---|
| EP | 0946021 | 9/1999 |
| WO | 9912380 | 3/1999 |

* cited by examiner

METHOD AND APPARATUS FOR EFFICIENT USE OF COMMUNICATION RESOURCES IN A DATA COMMUNICATION SYSTEM UNDER OVERLOAD CONDITIONS

BACKGROUND

I. Field of the Invention

The disclosed embodiments relate to the field of data communications. More particularly, the disclosed embodiments relate to a novel method and apparatus for efficient use of the communication resources in a data communication system under overload condition.

II. Background

A communication system for communication of data may reach its capacity due to many different factors. The communication system may have an access network, a packet switched data network, and a number of access terminals. The access terminal and the access network, while complying with a number of communication protocols, establish and maintain a connection for communication of data. The connection between the access terminal and the access network may be over a wireless link. The flow of data may be from access terminal to access network, or from access network to access terminal, or both. The access terminal may be connected to a computing device such as a lap top personal computer, or may be a self-contained data device such as a personal digital assistant. A mobile unit such as a cellular phone may also be an access terminal. An access terminal and an access network may communicate through a forward link, originated from the access network, and a reverse link, originated from the access terminal.

The access network may reach its capacity due to several factors depending on the type of technology employed. Generally, depending on the number of users and the users' demand for data communication, an access network may reach its capacity. The intensity of the user's demand for data flow depends on the application and the type of data being communicated. The applications may include downloading data files, Internet web browsing, audio/video streaming, transaction-oriented applications such as commerce transactions, playing games, etc. The type of data may include documents, images, audio/video, etc. In a congested state or an overload condition, new users attempting to access the access network may be denied access due to lack of available resources. Although such a blocking scheme may be appropriate for voice networks, in data networks, a user may prefer to have a connection with slow data flow rather than no connection at all.

Generally, to this end and as well as others, there exists a need in the art for an efficient use of communication resources in a communication system under overload condition, which allows the users to access the network even though the use of the communication resources has reached a congested level.

SUMMARY

In a communication system for communication of data, a method and apparatus provides for detecting an overload condition and a request for opening a connection for a user for communication of data, selecting an open connection, releasing the selected open connection, and allocating, to the user, communication resources corresponding to resources released based on releasing the selected open connection.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

A novel and improved method and apparatus for efficient use of communication resources under an overload condition is described. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
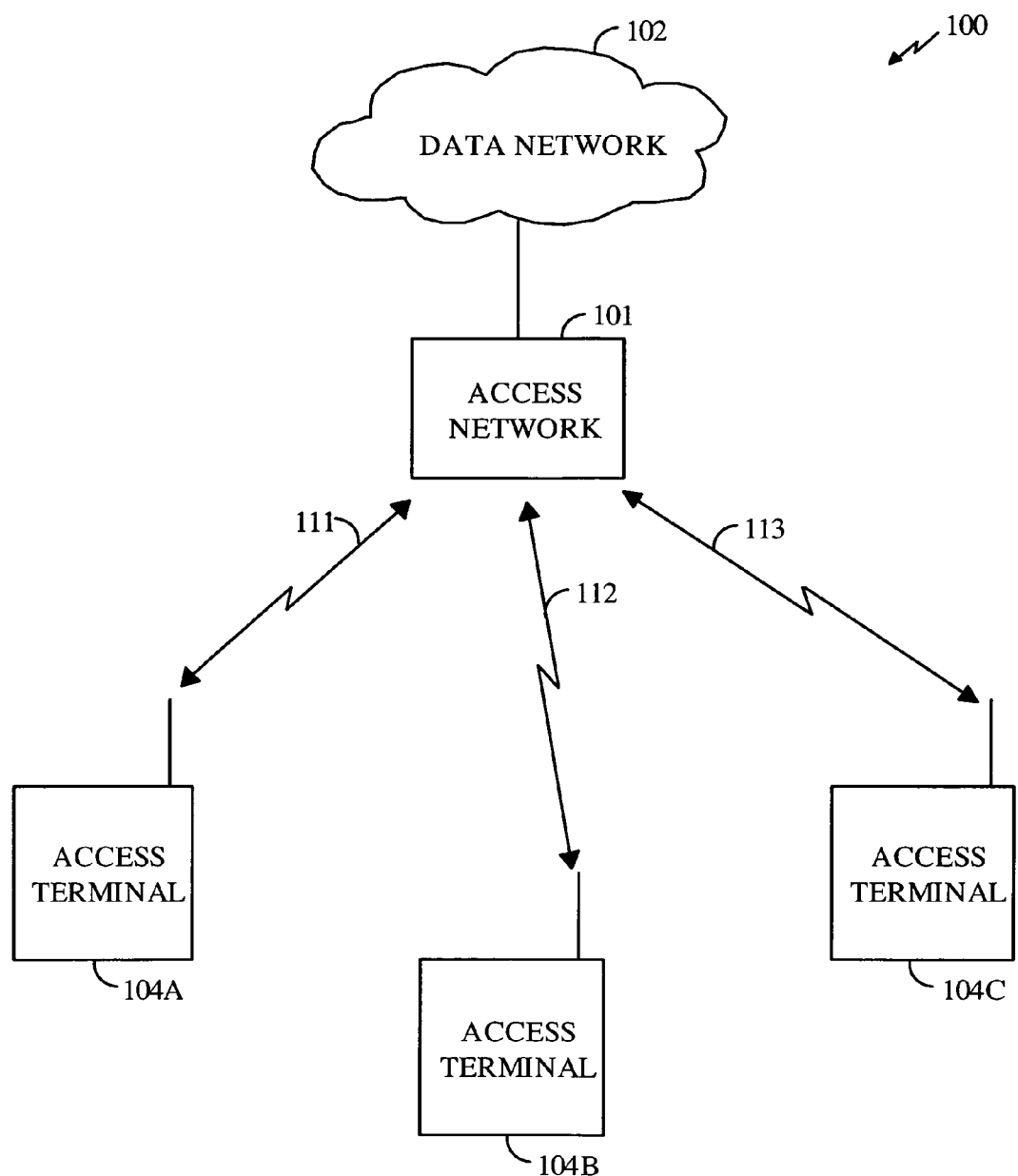
FIG. 1 illustrates various blocks of a wireless data communication system.

FIG. 1 illustrates a communication system 100 in accordance with an embodiment. Access terminals 104A–C establish and maintain wireless connections with an access network 101 for communication of data. The data communication may be with hosts residing on data network 102. The wireless connections between access terminals 104A–C and access network 11 may be through, respectively, data links 111–113. Each link may include a forward link and a reverse link. Access terminals 104A–C and access network 101 may be operating as a transmitter unit or a receiver unit, or both concurrently, depending on whether data is being transmitted from, or received at, the respective terminals. In an embodiment, the data communication in communication system 100 may be in accordance with the Code Division Multiple Access 2000 High Data rate Packet Interface Specification, incorporated by reference herein. A copy of the specification may be obtained by access the World Wide Web at www.3gpp2.org.

Figure 2:
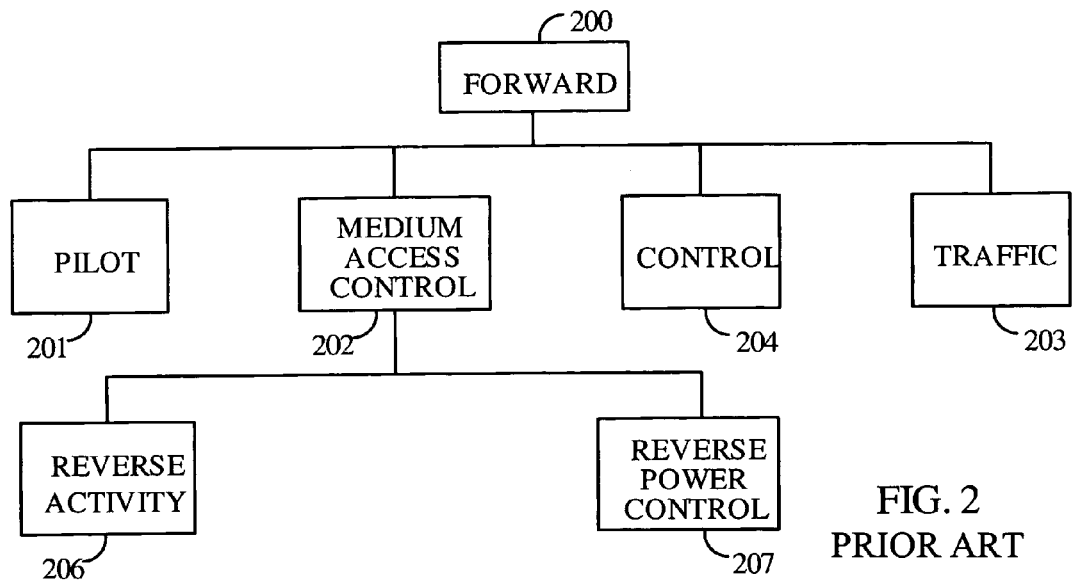
FIG. 2 illustrates a forward channel structure in a wireless data communication system.

FIG. 2 illustrates a forward channel structure 200 in accordance with an embodiment that may be used for data communication on the forward link. The forward link communication originates from access network 101. Forward channel structure 200 may include a pilot channel 201, a medium access control (MAC) channel 202, a traffic channel 203, and a control channel 204. MAC channel 202 may include a reverse activity channel 206, and a reverse power control channel 207. Reverse activity channel 206 is used to indicate the activity level on the reverse link. Reverse power control channel 207 is used to control the power at which access terminal 104 can transmit on the reverse link.

Figure 3:
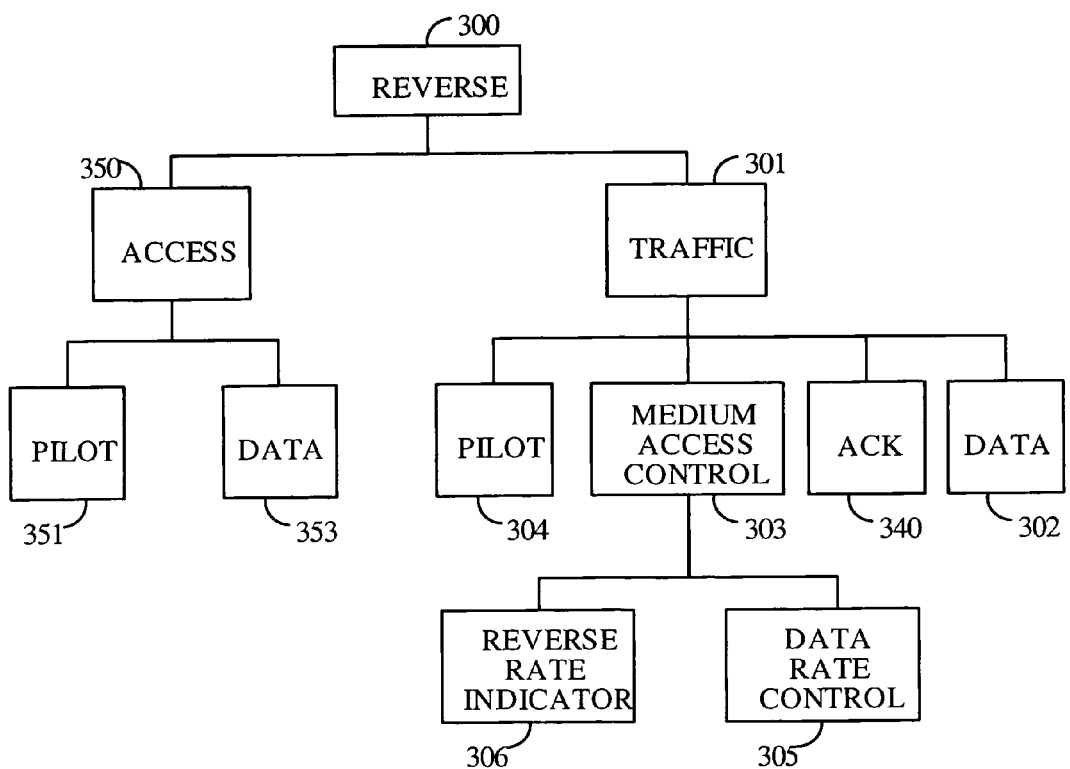
FIG. 3 illustrates a reverse channel structure in a wireless data communication system.

FIG. 3 illustrates, in accordance with an embodiment, a reverse channel structure 300 that may be used for data communication on the reverse link. The reverse link communication originates from access terminal 104. Reverse channel structure 300 includes an access channel 350 and a traffic channel 301. Access channel 350 includes a pilot channel 351, and a data channel 353. Traffic channel 301 includes a pilot channel 304, a MAC channel 301, an acknowledgement (ACK) channel 340, and a data channel 302. MAC channel 303 includes a reverse link data rate indicator channel 306, and a data rate control channel 305. ACK channel 340 is used for communicating whether a unit of data has been decoded successfully at access terminal 104. Reverse Rate Indicator channel 306 is used for indicating the rate at which access terminal 104 is current transmitting. Data rate control channel 305 indicates a data rate that access terminal 104 is capable of and/or desires receiving on the forward link 200.

Figure 4:
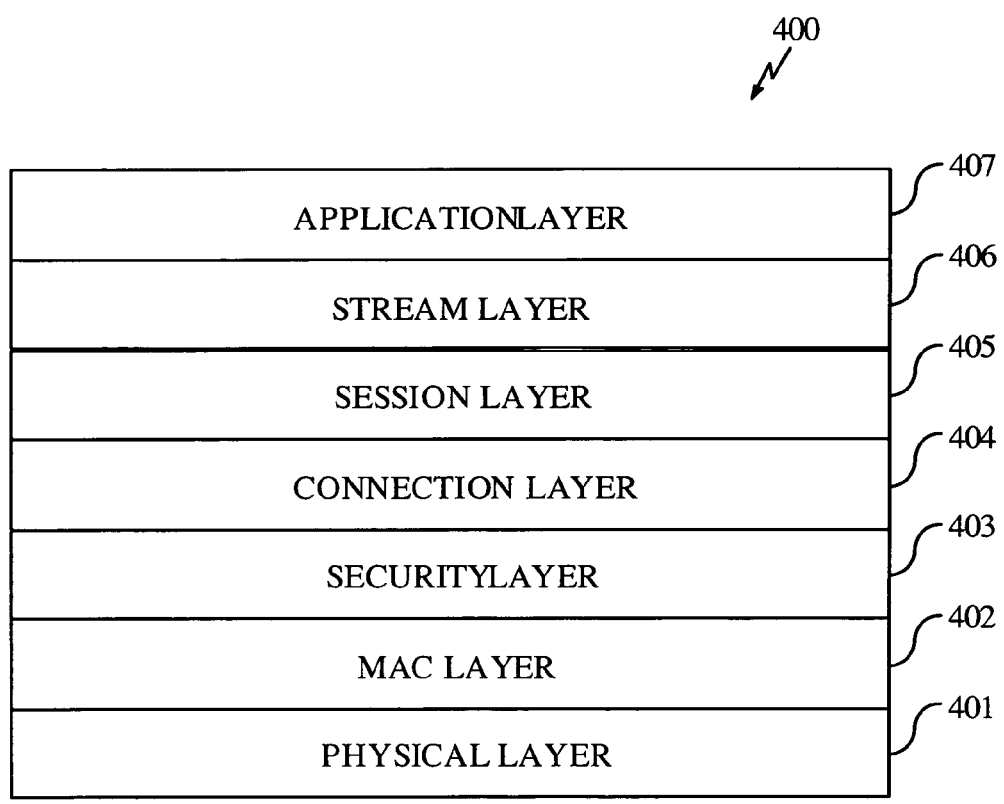
FIG. 4 illustrates a communication protocol stack for over the air interface in a wireless data communication system.

FIG. 4 illustrates, in accordance with an embodiment, a communication protocol stack 400 for over the air interface between access terminal 104 and access network 101. The operations of forward channel 200 and reverse channel 300 may be according to communication protocol stack 400. Communication protocol stack 400 may include a physical layer 401, a MAC channel layer 402, a security layer 403, a connection layer 404, a session layer 405, a stream layer 406, and a application layer 407. Physical layer 401 provides the channel structure, frequency, power output, modulation, and encoding requirements for forward channel 200 and reverse channel 300. MAC channel layer 402 defines the procedures used to receive and transmit over physical layer 401. Security layer 403 provides authentication and encryption services. Connection layer 404 provides over the air link data connection establishment and maintenance services. Session layer 405 provides protocol negotiation, configuration, and session state maintenance functionality. Stream layer 406 provides multiplexing of distinct applications. Application layers 407 provide default signaling and default packet application for transporting signaling and user data between an access network and an access terminal.

Figure 5:
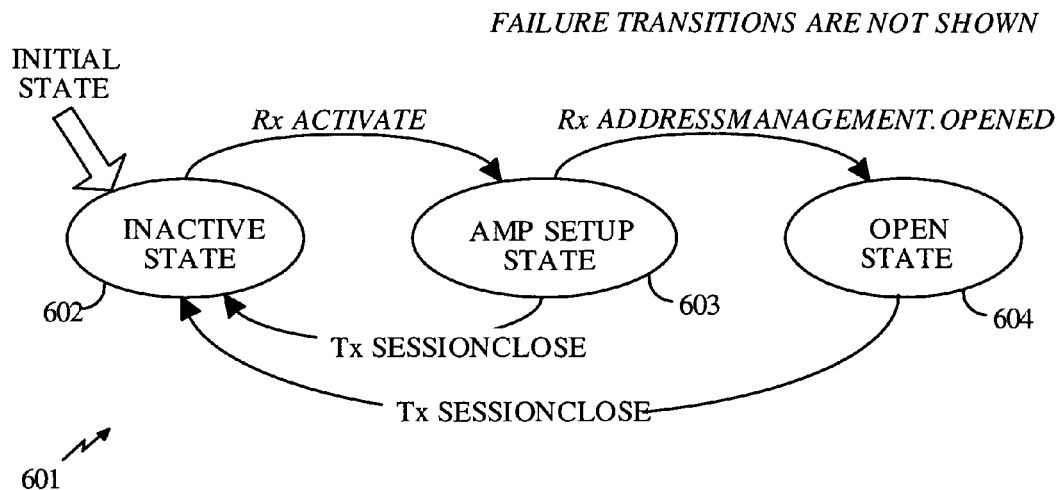
FIG. 5 illustrates the operating states of a Session Configuration Protocol at an access network and an access terminal in a wireless data communication system.
Figure 5:
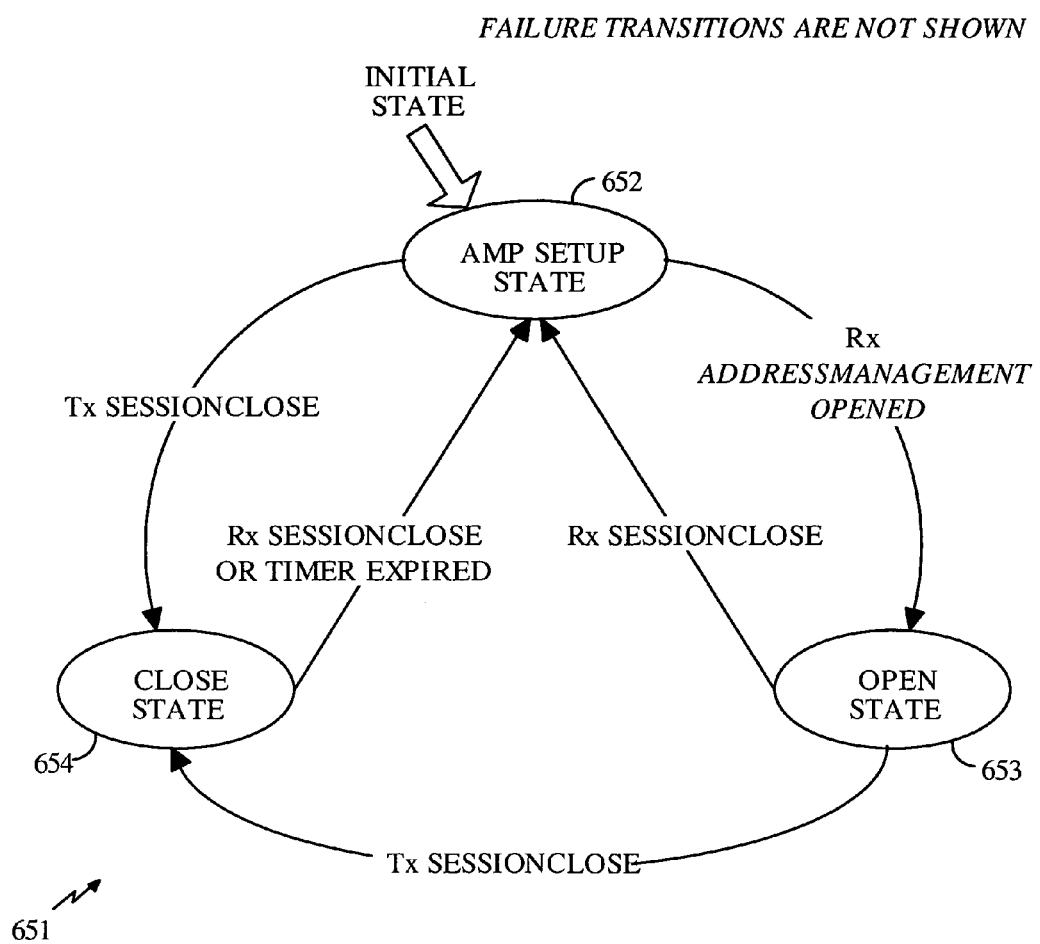

FIG. 5 illustrate, in accordance with an embodiment, the operating states at access network 101 and access terminal 104 in accordance with session layer protocol 405. Before any connection for data flow can be set up, a session needs to be established between access terminal 104 and access network 101. Session layer protocol 405 controls and allows access terminal 104 and access network 101 to negotiate and configure a session. Session layer protocol 405 provides the control aspects of opening, closing, and managing a session between access terminal 104 and access network 101 in accordance with an embodiment. Once a session has been opened, access terminal 104 and access network 101 may set up a connection for exchange of control information and user data.

Operating states 601 of session layer protocol 405 pertain to access terminal 104 for initiating, establishing, and closing a session with access network 101. Session operating states 601 may include inactive state 602, address management protocol (AMP) setup state 603, and open state 604. Operating states 651 of session layer protocol 405 pertain to access network 101 establishing, and closing a session with access terminal 104. Session operating states 651 include AMP setup state 652, open state 653, and close state 654.

Access terminal 104, in accordance with an embodiment, begins at inactive state 602, and access network 101 begins at AMP setup state 652. In inactive state 602, access network 101 and access terminal 104 have no communication with each other. To activate a session, access terminal 104 enters AMP setup state 603. In the AMP setup state 603, access terminal 104 and access network 101 exchange several messages according to the AMP. Access network 101 assigns a Unicast Access Terminal Identifier (UATI) to access terminal 101. Successful completion of negotiation and configuration causes a transition to the Open States 604 and 653 in, respectively, access terminal 104 and access network 101. If the session is closed, access network 101 and access terminal 104 enter, respectively, close state 654 and inactive state 602. In the close state 654, access network 101 waits for a Session-Close message from access terminal 104. Upon receipt of a Session-Close message or upon expiration of a timer, access network 101 transitions to AMP Setup State 652. Access network 101, in accordance with an embodiment, may have several processors or several processes in a processor assigned to maintain sessions with access terminals 104A–C.

Establishing a session is required prior to establishing a connection for communication of data. Establishment and maintenance of a connection are controlled by connection layer protocol 404. Access terminal 104 and access network 101 may have established a session, but may not have a connection for communication of data. Moreover, the access terminal 104 and access network 101, in accordance with an embodiment, may open and close connections several times during a single session. A session may be closed when access terminal 104 leaves the coverage area provided by access network 101, or during such prolonged periods which access terminal 104 is unavailable for any communication. The unavailability of access terminal 104 may be detected by access network 101.

The connection layer protocol 404, in accordance with an embodiment, may consist of several sub-protocols that deal with the state of the air link connection. Such sub-protocols may include Air Link Management (ALM) protocol, Initialization State protocol, Idle State protocol, and Connected State protocol. The ALM protocol maintains the overall connection states in access terminal 104 and access network 101. The ALM protocol activates other protocols depending on its current state. The initialization protocol performs actions associated with the access terminal in the process of acquiring the access network. The Idle State Protocol performs actions associated with an access terminal that has acquired the access network, but does not have an open connection. The Connected State Protocol provides procedures associated with an access terminal that has an open connection.

Figure 6:
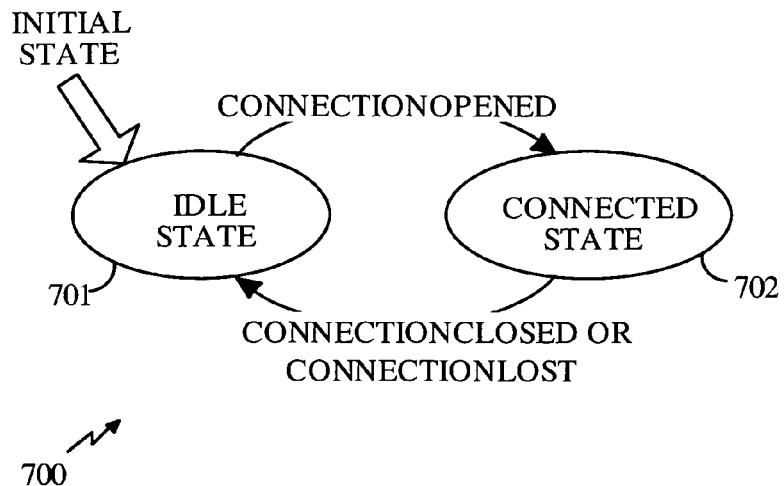
FIG. 6 illustrates the operating states at an access network and an access terminal in accordance with an Air Link Management Protocol.
Figure 6:
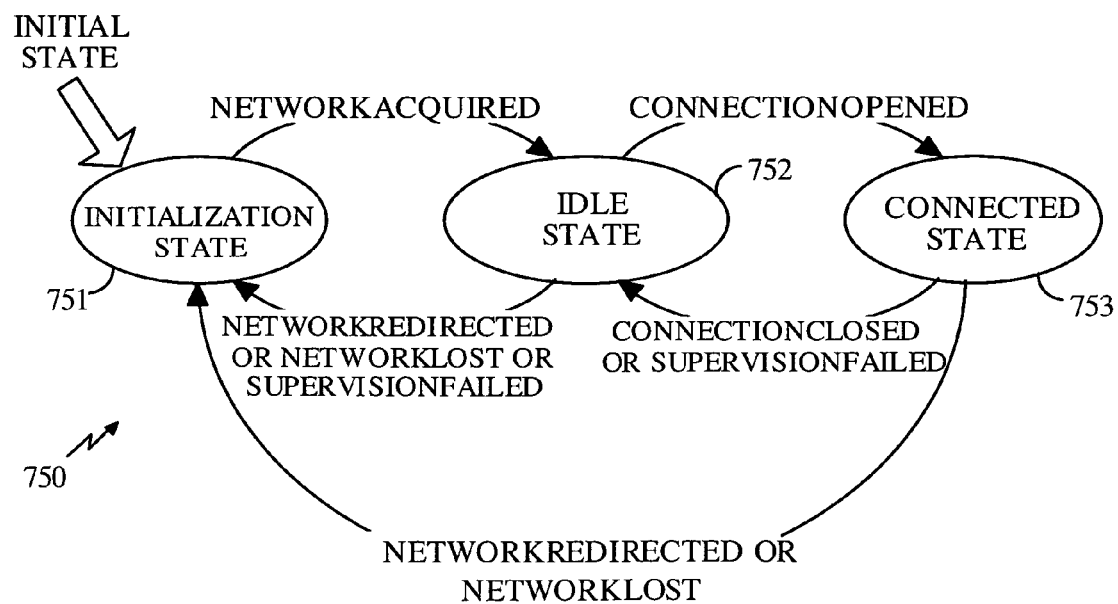

FIG. 6 illustrates the operating states at access network 101 and access terminal 104 of an Air Link Management Protocol in accordance with an embodiment. Air Link Management Protocol through its associated operating states manages an initial acquisition of access network 101 by access terminal 104, and establishment, maintenance, and closure of a connection between access network 101 and access terminal 104. The Idle State Protocol and the Connected State Protocols provide mechanisms for access terminal 104 and access network 101 to open and close a connection. FIG. 6 depicts, in accordance with an embodiment, Air Link Management Protocol states 700 associated with access network 101, and Air Link Management Protocol states 750 associated with access terminal 104.

Air Link Management Protocol states 700 for access network 101 may include idle state 701, and connected state 702. Air Link Management Protocol states 700 may also include an initialization state (not shown) for access network 101. A single instance of initialization state would serve all access terminals. Air Link Management Protocol states 750 for access terminal 104 may include initialization state 751, idle state 752, and connected state 753. During initialization state 751, access terminal 104 acquires an access network, such as access network 101. To acquire an access network, access terminal 104 first selects the access network, such as access network 101. Second, access terminal 104 acquires pilot channel 201 transmitted from the selected access network, and third, access terminal 104 synchronizes with the selected access network. Once access network 101 is acquired, access terminal 104 enters idle state 752 and access network 101 enters idle state 701. Access network 101 and access terminal 104 do not have a connection during idle states 701, 752. A connection may be opened in idle state 701 by access network 101, or idle state 752 by access terminal 104.

A connection between access network 101 and access terminal 104 may be opened or closed by both access network 101 and access terminal 104 in accordance with an embodiment. Once a connection is opened, the Air Link Management Protocol is in the connected state. The connection may be closed by either one of access network 101 and access terminal 104. A connection may also be closed due to loss of communications between access network 101 and access terminal 104.

Figure 7:
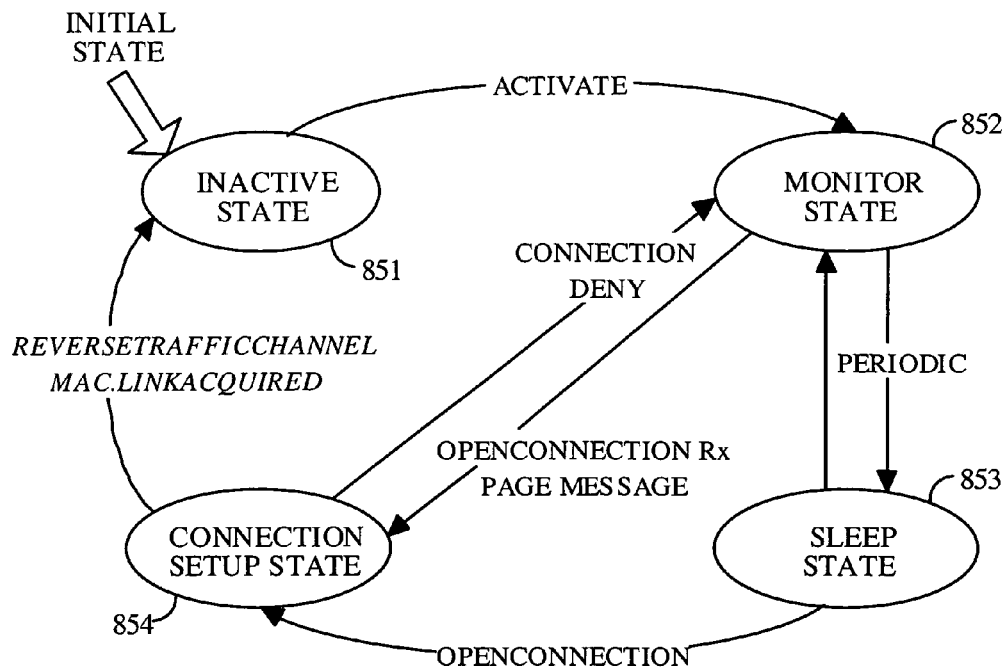
FIG. 7 illustrates various states of an Idle State Protocol.
Figure 7:
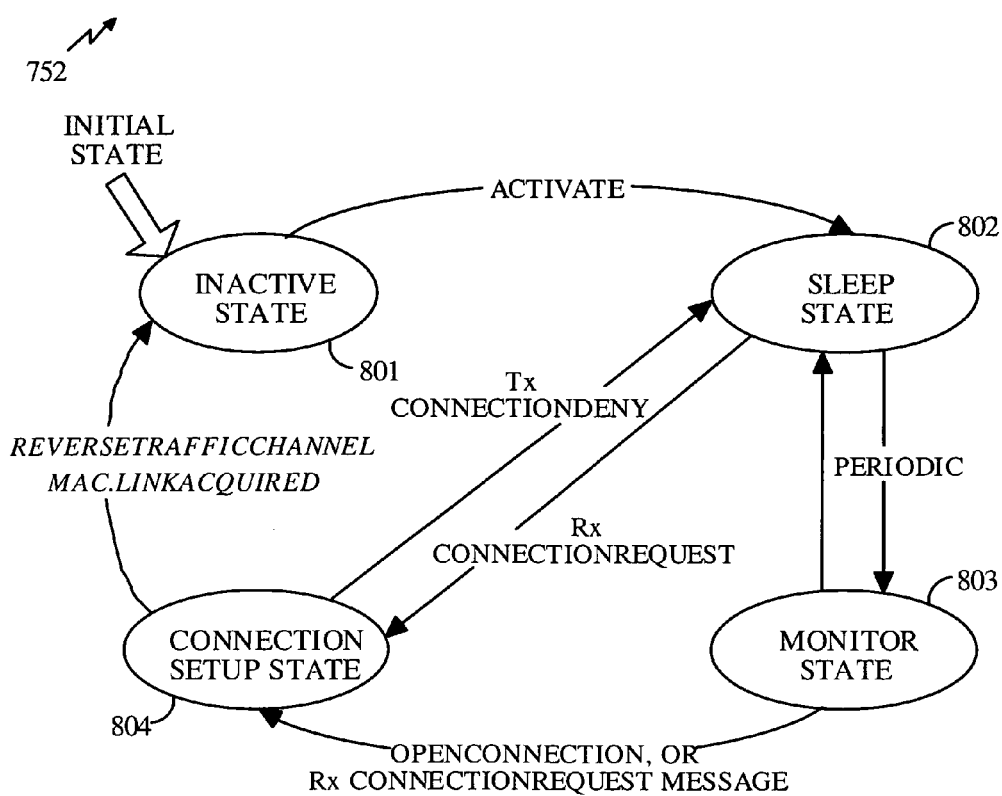

FIG. 7 illustrates, in accordance with an embodiment, various states of the Idle State Protocol, which are executed in idle state 701 associated with access network 101, and idle state 752 associated with access terminal 104. The states of the protocol in idle state 752 at access network 101 may include inactive state 851, monitor state 852, sleep state 853, and connection setup state 854. The states of the protocol in idle state 701 at access terminal 104 may include inactive state 801, monitor state 803, sleep state 802, and connection setup state 804. To conserve power at access terminal 104, access terminal 104 and access network 101 maintain sleep states 802, 853. Access network 101 does not send a message to access terminal 104 during the sleep periods, and access terminal 104 does not expect to receive any messages during the sleep period either, in accordance with an embodiment. Access network 101 may initiate the connection setup by sending a Page message, in accordance with an embodiment, and Access terminal 104 responds with a Connection-Request message. Alternatively, the access terminal 104 may initiate the connection setup by sending a Connection-Request message. The connection setup occurs in the connection setup states 854 and 804 of, respectively, access network 101 and the access terminal 104. If the connection is not denied, access terminal 104 and access network 101 exchange further messages to set-up a connection. The messages may include a Traffic-Channel-Assignment message, ACK message, and Traffic-Channel-Complete message. A successful establishing of a connection results in access terminal 104 being in connected state 873 (shown in FIG. 6), and access network 101 being in connected state 702 (shown in FIG. 6).

Figure 8:
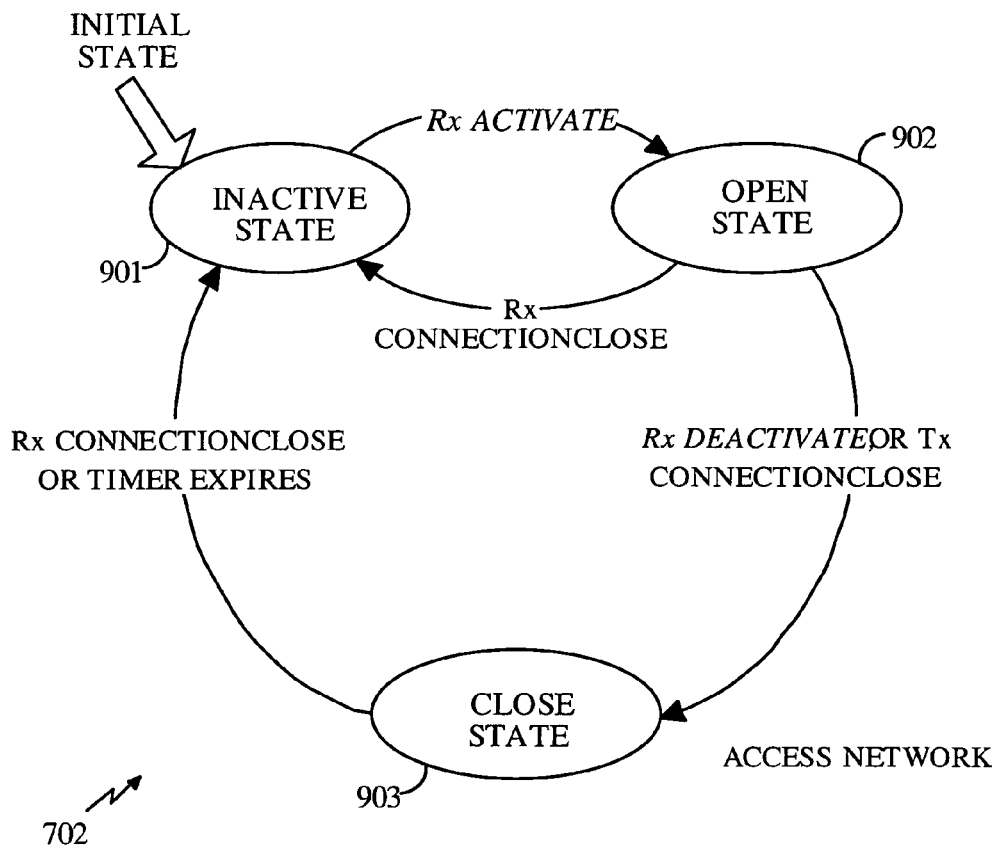
FIG. 8 illustrates various states of a Connected State Protocol.
Figure 8:
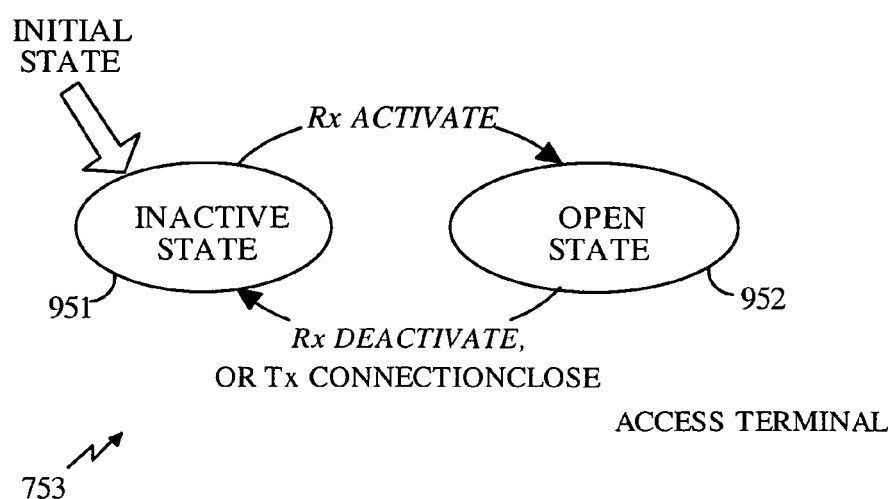

FIG. 8 illustrates, in accordance with an embodiment, various states of the Connected State Protocol, which is executed in connected state 702 associated with access network 101, and connected states 753 associated with access terminal 104. The states of protocol 753 of access terminal 104 may include inactive state 951, and open state 952. The states of protocol 702 of access network 101 may include inactive state 901, open state 902, and close state 903. Upon successful connection setup, access terminal 104 moves from inactive state 951 to open state 952. Similarly, upon successful connection setup, access network 101 moves from inactive state 901 to open state 902. Access terminal 104 and access network 101 may communicate data when they are in open states 952 and 902. Access terminal 104 may use reverse traffic channel 301 to communicate data to access network 101. Access network 101 may use forward traffic channel 203 for communicating data to access terminal 104. To terminate an open state at access terminal 104, access terminal 104 may transmit a Connection-Close message to access network 101. Access network 101 may initiate closing an open state by sending a Connection-Close message. Access network 101 after transmitting a Connection-Close message moves to close state 903. Access terminal 104 after receiving the Connection-Close message form access network 101, transmits a Connection-Close message to access network 101, and moves to inactivate state 951. Access network 101 after receiving the Connection-Close message from access terminal 104 moves from close state 903 to inactive state 901.

Access terminal 104 and access network 101 may use communication resources allocated during the setup phase to send and receive data during open states 952, 902. A connection may be in a busy open state or in an idle open state during open states 902, 952, in accordance with an embodiment. When a connection is in a busy open state, data exchange occurs between access network 101 and access terminal 104, either on the forward link, or on the reverse link, or on both. When there is no data to be exchanged, the connection transitions to the idle open state. When data becomes available for the transmission from either access network 101 or access terminal 104, the state of the connection transition from the idle open state to busy open state.

Figure 9:
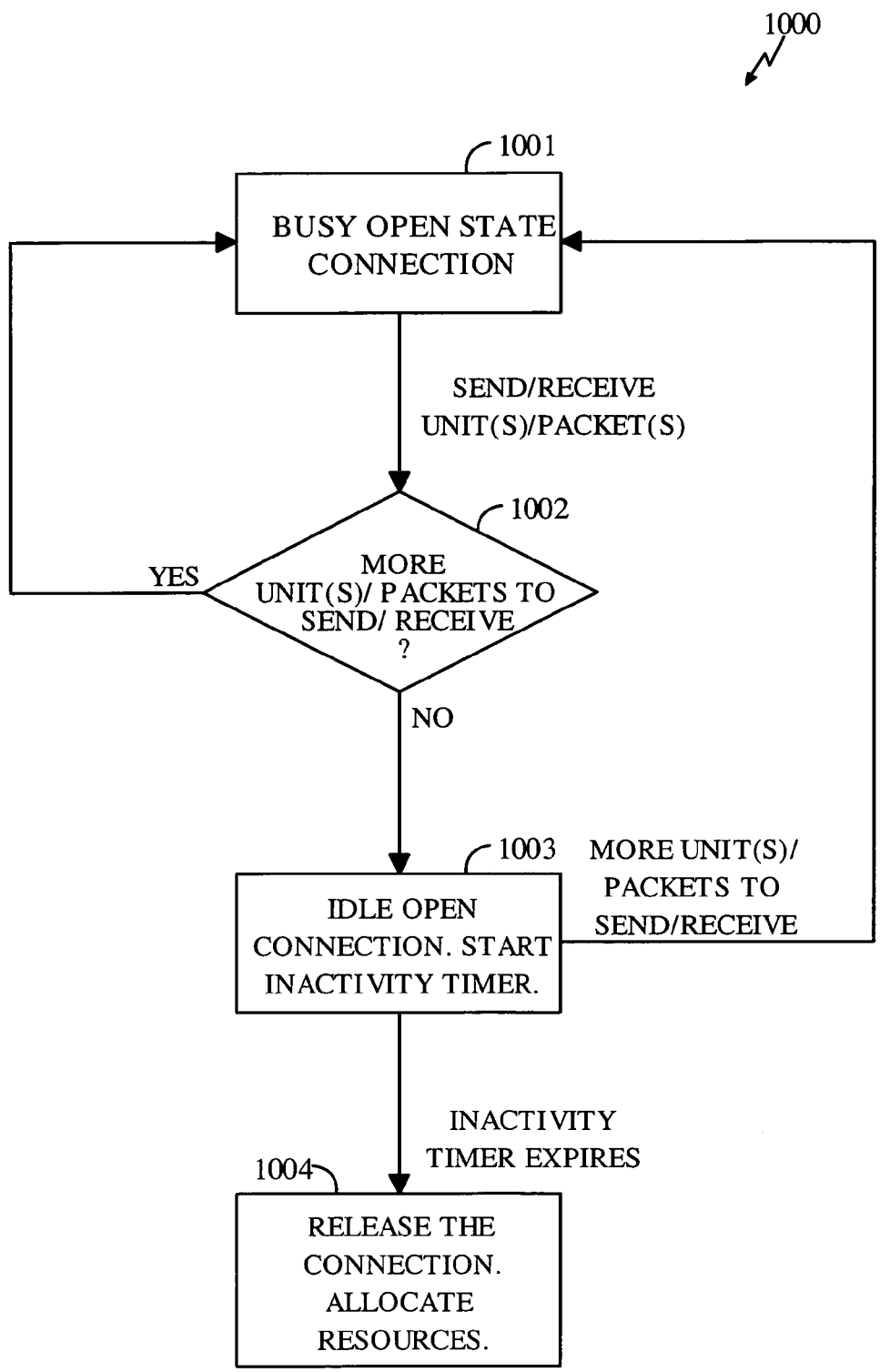
FIG. 9 illustrates a flow chart for maintaining a connection in an open state.

FIG. 9 illustrates, in accordance with an embodiment, a flow chart 1000 that may be used for maintaining a connection in an open state, such as open state 952 at access terminal 104 and open state 902 at access network 101. The flow chart 1000 may be implemented via a connection controller (not shown) in access network 101. At step 1001, access network 101 and access terminal 104 have an open connection in a busy open state for sending or receiving data. Data packets may be broken into smaller data units. In this case, the data units are transmitted on an over-the-air link. The controller in access network 101, in accordance with an embodiment, decides at step 1002 whether there is any data unit or any additional data packet to be sent to received over the open connection. If no data unit is going to be sent or received, at step 1003, the state of the open connection changes from the busy open state to an idle open state. On the other hand, if there are more data units or data packets to be sent or received, the control flow 1000 loops back to step 1001. An open connection in idle open state may have an associated inactivity timer, in accordance with an embodiment. Before the timer expires, if any data becomes available for transmission or reception, the control flow 1000 loops back to step 1001 for sending or receiving the data. At this time, the activity timer may be stopped. If the timer expires at step 1004, the open connection is closed in accordance with the connected state protocol, and the resources allocated to the connection are released for possibly being allocated to future incoming connection requests.

For establishing a new connection, in accordance with an embodiment, a resource manager at access network 101 determines the availability of resources. Once a connection setup is initiated by either access terminal 104 or access network 101, the connection request may be denied due to lack of resources. Lack of resources may be created due to, among many different reasons, having a large number of connections in the open state. An open connection may be in an idle open state. When the connection is in the idle open state, the allocated resources are not being utilized because the allocated resources are not being used for flow of data between the access terminal 104 and access network 101.

Figure 10:
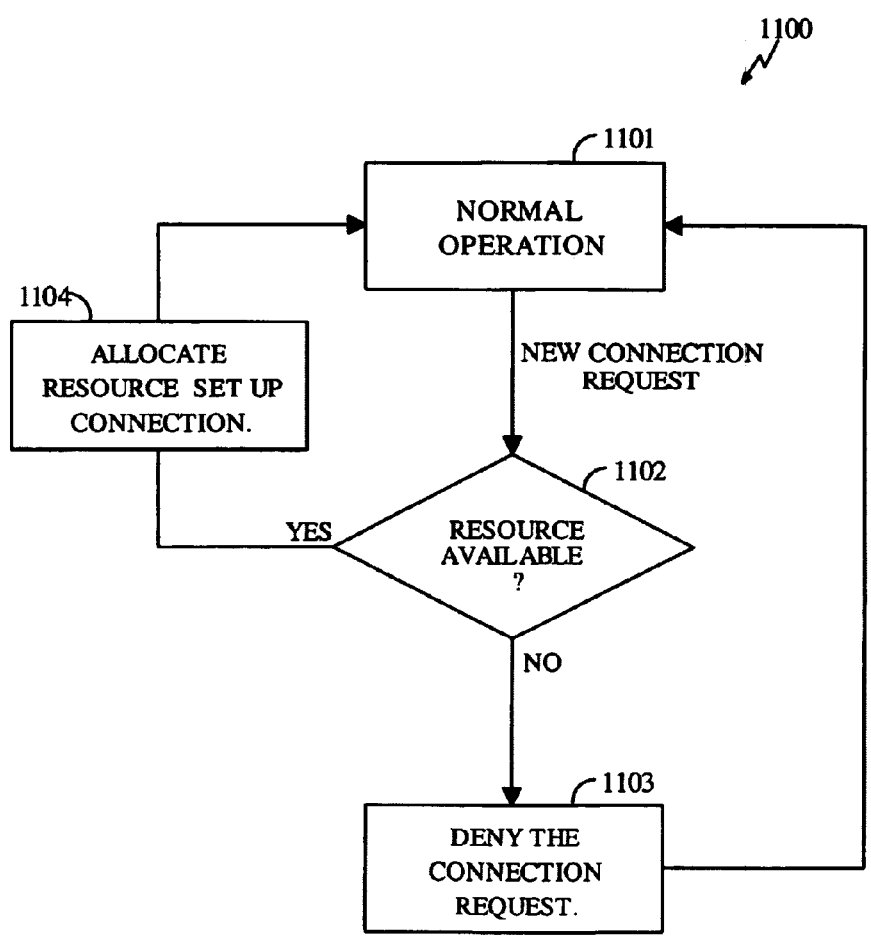
FIG. 10 illustrates a flow chart for use by a resource manager at an access network for allocation of resources.

FIG. 10 illustrates, in accordance with an embodiment, a flow chart 1100 for use by a resource manager at the access network 101. At step 1101, the resource manager may be in the normal operating state. Normally, several open connections may exist at the same time. Few of the open connections may be in the busy open state, while the others may be in the idle open state. The open connections, in accordance with an embodiment, in the idle state are running their respective inactivity timers. When a request for opening a new connection arrives, the source manager checks at step 1102 if any resources are available for allocation. If there are no resources available, the source manager at step 1103 denies the connection request, and the control flow loops back to step 1101. On the other hand, in accordance with an embodiment, if there are resources available, the resource manager at step 1104 accepts the request for opening a connection, and allocates resources to the new connection in a connection setup routine. Subsequently, the control flow loops back for the resource manager to step 1101.

Figure 11:
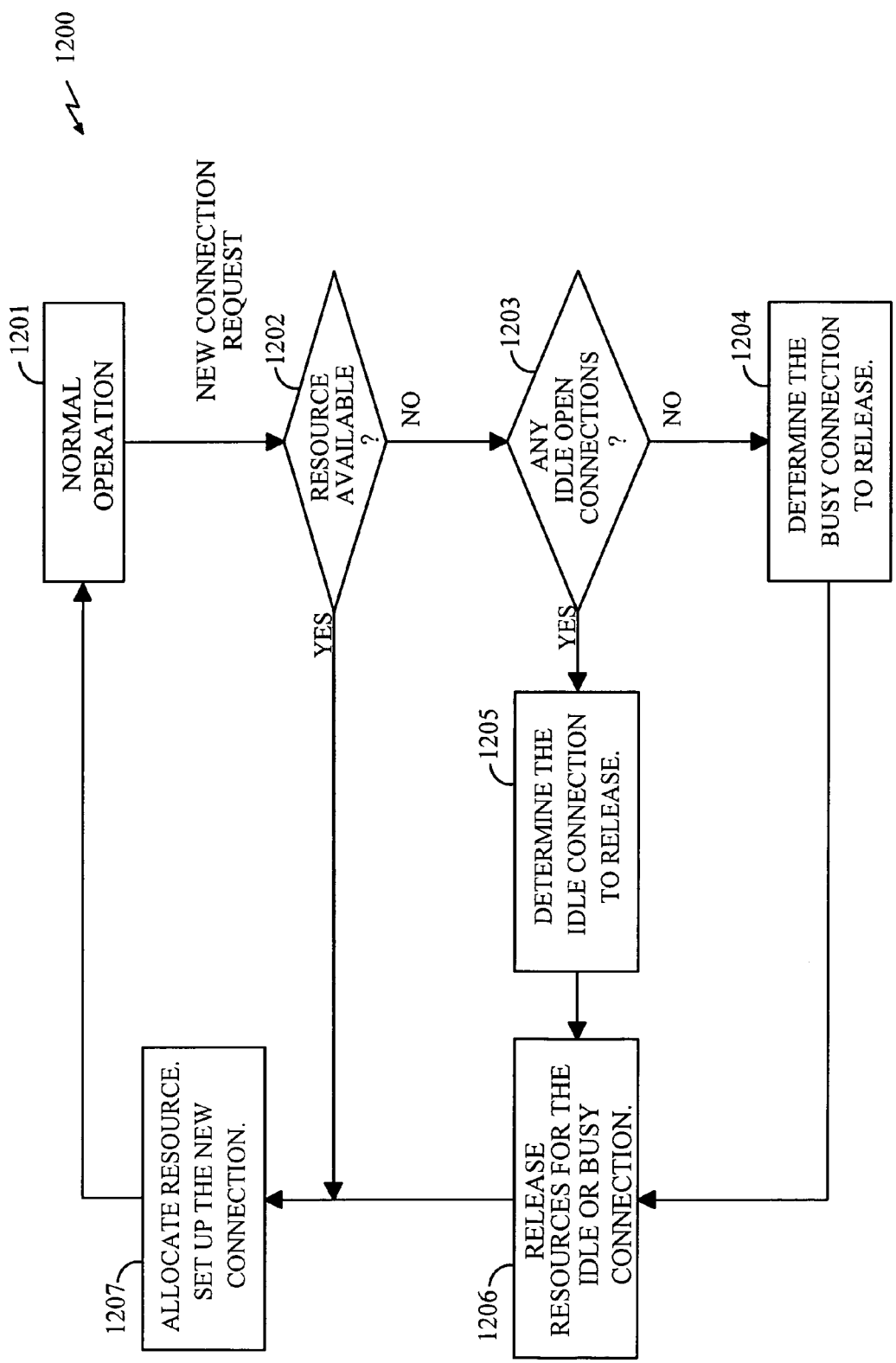
FIG. 11 illustrates a flow chart for use by a resource manager for efficient resource management under an overload condition.

FIG. 11 illustrates, in accordance with an embodiment, a flow chart 1200 for use by a resource manager for efficient resource management under an overload condition. Flow chart 1200 may be implemented in access network 101 in accordance with an embodiment. At step 1201, the source manager is in a normal operation state. In the normal operation state, access network 101 may have assigned resources to several connections in the busy open state and idle open state. When a request for setting up a new connection is detected, the resource manager at step 1202 checks for any available resources. If an available resource is detected, the resource manager at step 1207 allocates the available resource to the new connection. Subsequently, the control flow 1200 moves to step 1201. If no available resource is detected at step 1202, the control flow moves toe step 1203 to check if any connection is in the idle open state. One or more open connections may be in an idle open state. Each open connection in idle open state would have an associated inactivity timer. The resource manager decide to release at least one of the connections in idle open state at step 1202. At step 1206, the sources allocated to the selected open connection in idle state are released, and at step 1207, the released resources are allocated to the new connection.

When more than one connection in idle open state is detected at step 1203, in accordance with an embodiment, the resource manager may decide based on a random selection to release any of the detected connections in idle state. Alternatively, in accordance with an embodiment, the controller may use some criteria for the selection. For example, a connection with the longest idle time or a connection selected from a group of connections with idle times longer than a predetermined period of time may be selected for release. Moreover, in accordance with an embodiment, a connection in idle state may be selected for release based on the period of time that is the combined periods of time that the connection has been in busy and idle open states. The criteria for selecting a connection in idle state for release, in accordance with an embodiment, may include selecting a connection that has been used to transfer the largest amount of data during a predetermined time prior to the release time, or a connection selected from a group of connections that were used to transfer at least a predetermined amount of data during a predetermined time period prior to the release time. This predetermined time period may be a period of time since the connection has been in an open state. The amount of data may be the amount of data transferred over the forward link, or the reverse link or the aggregate of both, in accordance with various embodiments.

If no connection is detected to be in idle open state, and all connections are in busy open state, in accordance with an embodiment, the resource manager at step 1204 selects one of the connections in busy open state for release. At step 1206, resources allocated to the selected connection are released, and at step 1207, the released resources are allocated to the new connection, in accordance with an embodiment. The resource manager may select based on a random selection to release a connection at step 1204 from all the connections in busy state, in accordance with an embodiment. The source manager may use some criteria for the selection in accordance with an embodiment. For example, a connection with the longest time in busy open state, or a connection selected from a group of connections with a busy open state time longer than a predetermined period of time may be selected for release. Moreover, in accordance with an embodiment, a connection in busy open state may be selected for release based the period of time that the connection has been in the open state of the Connected State Protocol. The period that a connection may be in the open state is determined, in accordance with an embodiment, based on the combined periods that the connection has been in busy open and idle open states. The criteria for selecting a connection in busy open state for release may include, in accordance with an embodiment, selecting a connection that has transferred the largest amount of data during a predetermined period of time. The predetermined period of time may be a period of time prior to the release time, in accordance with an embodiment. A connection may be selected from a group of connections that have transferred more than a predetermined amount of data during a predetermined time. The predetermined period of time may be a period of time prior to the release time. The predetermined period of time may be the time since the connection was set up. The amount of data may be the data transferred over the forward link, or the reverse link or the aggregate of both, in accordance with various embodiments.

Alternatively, at step 1203, any connection, either in busy open state or idle open state, may be selected, in accordance with an embodiment, for release based on a random selection, or based on a criterion similar to other criteria described herein.

Figure 12:
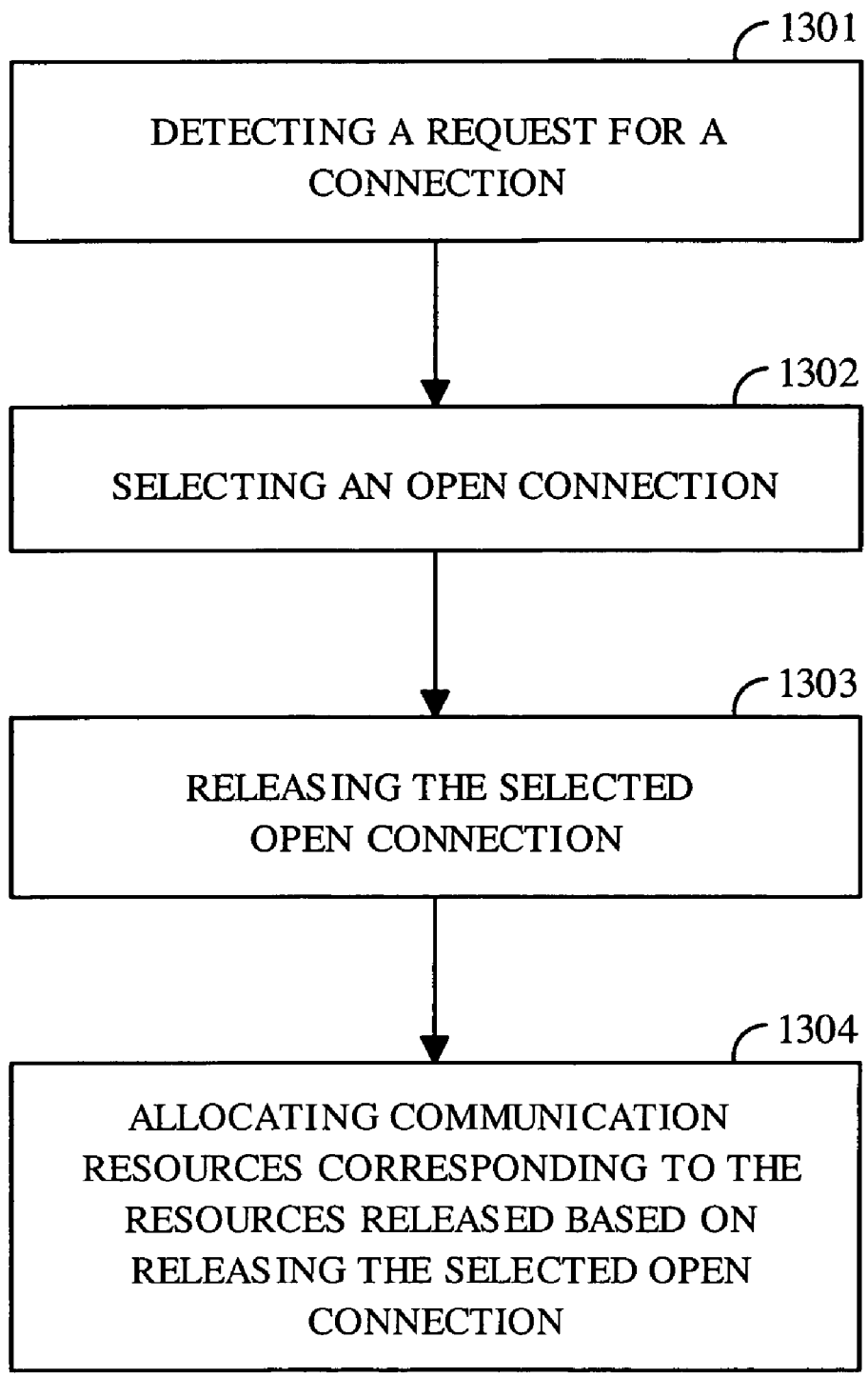
FIG. 12 depicts a flow chart for allocating communication resources to a user when there are no free resources available.

Generally stated, in accordance with an embodiment, in a communication system for communication of data, a method and apparatus provides for an efficient allocation of communication resources under overload condition. FIG. 12 depicts a flow chart, in accordance with an embodiment, for allocating communication resources to a user, when there are no free resources available. At step 1301, a request is detected for opening a connection for a user for communication of data. At step 1302, an open connection is selected. At step 1303, the selected open connection is released. At step 1304, the communication resources corresponding to resources released based on releasing the selected open connection are allocated to the user. The selected open connection may be in the idle open state or in the busy open state, in accordance with an embodiment. Therefore, the selected open connection, in accordance with an embodiment, is in an idle open state, and the selected open connection, in accordance with another embodiment, is in a busy open state.

It may be necessary at 1302 to determine whether an open connection is in an idle open state in the communication system. If an open connection is determined among all connections to be in idle open state, the selected open connection for release is the determined open connection in the idle open state. If two or more open connections are in an idle open state, an open connection with a longest idle open state connection time is determined from the two or more open connections in the idle open state. The selected open connection for release, in accordance with an embodiment, is the determined open connection with the longest idle open state connection.

Alternatively or in addition, in accordance with an embodiment, an open connection is determined from the two or more open connections in the idle open state based on the amount of data transferred in a predetermined period of time. The selected open connection may be the connection that has transferred the largest amount of data in the predetermined period of time. The predetermined time may be the connection duration. The amount of data may be the data transferred over the forward link, or the reverse link or the aggregate of both.

Alternatively or additionally, an open connection with the longest combined idle open state connection time and busy open state connection time is determined from the two or more open connections in the idle open state. The selected open connection may be the determined open connection with the longest combined idle open state connection time and busy open state connection time.

Alternatively or additionally, the selection of the open connection may be based on a random selection from the two or more open connections in the idle open state, in accordance with an embodiment.

It may be necessary at 1302 to determine whether an open connection is in a busy open state and no open connection is in an idle open state. The selected open connection, in accordance with an embodiment, is the open connection in the busy open state.

Alternatively or additionally, in accordance with an embodiment, an open connection with the longest busy open state connection time is determined from the two or more open connections. The selected open connection may be the determined connection from the two or more open connections with the longest busy open state connection time.

Alternatively or additionally, an open connection is determined from the two or more busy open connections based on the amount of data transferred over a predetermined period of time. The selected open connection is the determined open connection that is used to transfer the largest amount of data in the predetermined period of time. The predetermined period for a connection may be the duration for which the connection has been open. The predetermined period of time may be a period of time immediately preceding the determining of the open connection from the two or more open connections used to transfer the amount of data in the predetermined period of time.

Alternatively or additionally, in accordance with an embodiment, an open connection is determined from the two or more open connections with the longest combined idle open state connection time and busy open state connection time. The selected open connection is the determined connection with the longest combined idle open state connection time and busy open state connection time.

It may be necessary at 1302 to determine whether at least an open connection is in the busy open state and at least an open connection is in the idle open state. The selected open connection in accordance with an embodiment may be one of the determined open connections. If the list of the open connections includes two or more open connections in the busy open state and two or more open connections in the idle open state, an open connection is determined from the two or more open connections with the longest idle open state connection time. The selected open connection is the determined open connection with the longest idle open state connection time.

Alternatively or additionally, in accordance with an embodiment, an open connection is determined from the two or more open connections with the longest busy open state connection time. The selected open connection is the determined open connection with the longest busy open state connection time. Alternatively or additionally, an open connection is determined from the two or more open connections. The determined open connection is used to transfer a predetermined amount of data in a predetermined period of time. The selected open connection is the determined open connection used to transfer the predetermined amount of data in the predetermined period of time. The predetermined amount of data may be the largest amount of data transferred by users of the two or more open connections in the busy open state and the idle open state. The period of time may be the connection duration or a period of time immediately preceding determining the open connection from the two or more open connections that is used to transfer the predetermined amount of data in the predetermined period of time.

Additionally or alternatively, in accordance with an embodiment, an open connection is determined from the two or more open connections. The determined open connection is used to transfer data at a predetermined data rate in a predetermined period of time. The selected open connection is the determined open connection from the two or more open connections used to transfer data at a predetermined data rate in the predetermined period of time. The predetermined data rate is the highest data rate used by users of the two or more open connections. The predetermined period of time may be a period of time immediately preceding determining the open connection from the two or more open connections used to transfer data at the predetermined data rate in the predetermined period of time.

Alternatively or additionally, in accordance with an embodiment, an open connection is determined from the two or more open connections with the longest combined idle open state connection time and busy open state connection time. The selected open connection is the determined connection with the longest combined idle open state connection time and busy open state connection time.

Figure 13:
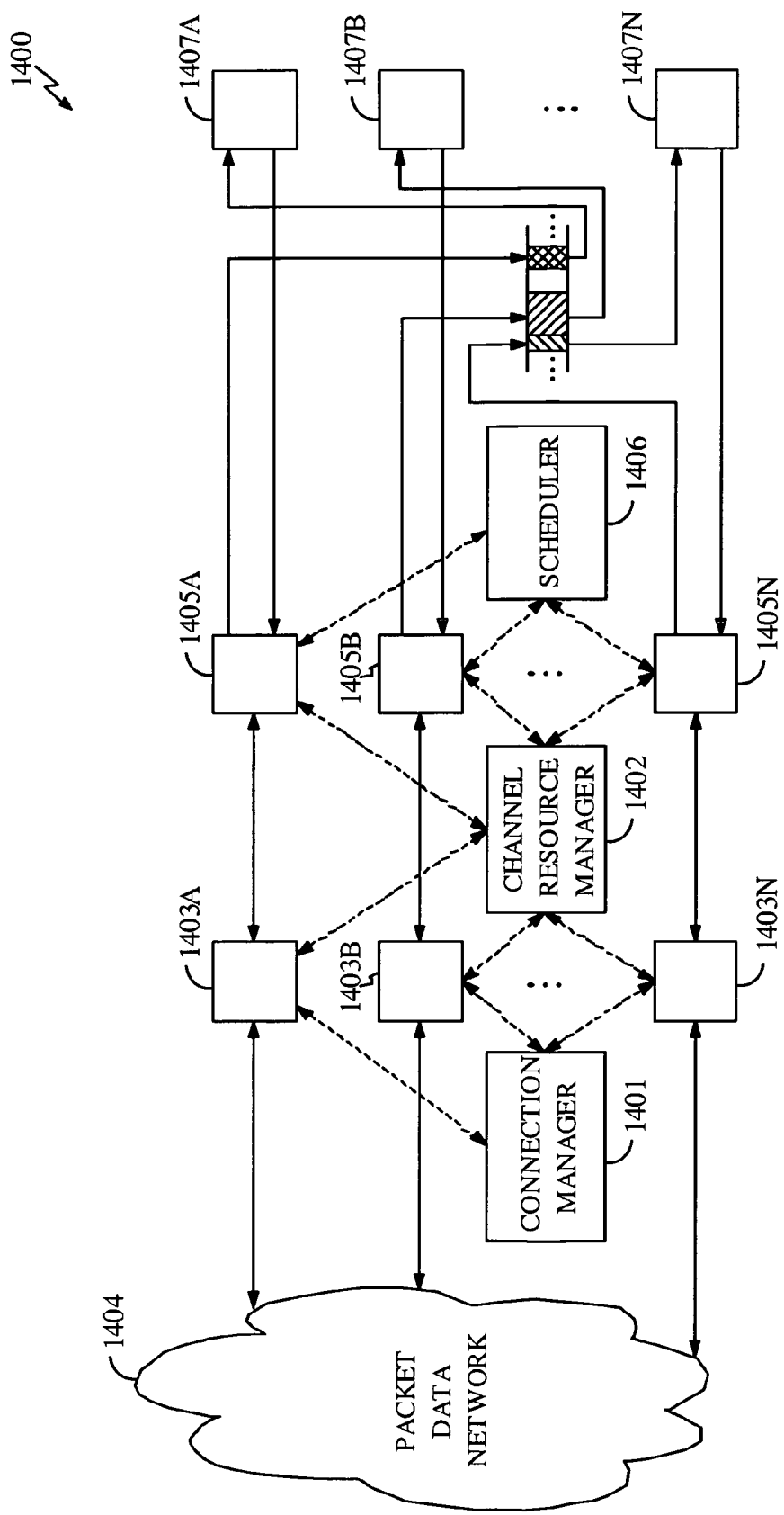
FIG. 13 depicts a block diagram of a controller for controlling and managing connections in an access network.

FIG. 13 depicts a general block diagram of a controller 1400, in accordance with an embodiment, for controlling connections in access network 101. Controller 1400 may include a connection manager 1401 and a channel resource manager 1402. Connection manager 1401 controls allocation/de-allocation of a number of independent connection controllers 1403A–N. Connection controller 1403 controls various aspects of a connection between access terminal 104 and access network 101. The controlling aspects may include controlling flow of data packets between access terminals 1407A–N and data network 1404. Other controlling aspects may include mobility management, soft handoff, hard handoff, and radio link protocol. Channel resource manager 1402 controls a number of channel resources 1405A–N. Channel resources 1405A–N may include data queuing, modulating, demodulating, and decoding functions. In the forward direction, the channel resources 1405A–N may interface with the scheduler 1406. Scheduler 1406 determines which connection to serve and schedules a data unit from resources 1405A–N to be transmitted on a time division basis to an access terminal in access terminals 1406A–N. An open connection may be viewed as a connection between access terminal 104 and data network 1404 where a connection controller from connection controllers 1403A–N and a channel resource from resources 1405A–N are assigned to the connection. Channel resource manager 1402 controls allocation/de-allocation (as indicated by dotted lines) of each channel resource in resources 1405A–N, and connection manager controls allocation/de-allocation (as indicated by dotted lines) of each connection controller in connection controllers 1403A–N, in accordance with an embodiment. When a request for a connection is received, connection manager 1401 assigns a connection controller 1403 to the connection. At this point, the assigned connection controller takes over the controlling aspect of the connection. Connection controller 1403 communicates with channel resource manager 1402 for assigning a channel resource to the connection. Once a resource is assigned, the connection controller communicates directly with the selected resource to set up a connection path from access terminals 1407A–N to data network 1404. The functions performed by each channel resource 1405A–N may include modulating the data for transmission to access terminal on a forward radio link and demodulating/decoding data received on a reverse link. Note that the physical location of the connection manager 1401 and the channel resource manager 1402 may vary depending on the implementation.

When all the channel resources are used by open connections and a request for a connection is detected, the channel resource manager 1402 may select one of the connections and the associated assigned resources for release, and assign the released resources to perform functions associated with data flow of the new connection. The selected open connection may be in an idle open state or in a busy open state, in accordance with an embodiment. If more connections are in the open state, a connection may be selected based on the criterion described herein. When a connection is released, the channel resources 1405A–N and the connection controller resources 1403A–N allocated to the connection are released.

To determine when an overload condition has been reached, i.e., when there are no more channel resources available for allocation, or when the available channel resources are limited, the channel resource manager 1402 may employ several techniques. A method may include, in accordance with an embodiment, establishing a pre-configured number of maximum connections per channel, which are configured during system installation. When such a number of pre-configured connections has been reached, the channel resource manager 1402 may assume the channel to be overloaded or has reached the limit. An alternative method or in addition, in accordance with an embodiment, may be to monitor the reverse link loading. When the loading exceeds a certain threshold, the channel may be considered overloaded. In an embodiment, this can be accomplished by monitoring the reverse link busy data bit. When the fraction of time of the busy data bit is set over a predetermined window of time and exceeds a threshold, the channel may be considered overloaded. The threshold may be predetermined. The overload condition or the condition of the limited availability of channel resources may be determined based on other factors. For example, the activity level on the overhead channels such as reverse link pilot channel, or supplemental channels, the data rate control channel, or reverse link power control sub-channel may determine the overload condition. Additionally, or alternatively, the overload connection may be determined based over utilization of the power control channels, or lack of headroom on the power level of the forward link signal.

To determine the connection for release according to the described algorithms herein, the channel resource manager 1402 may estimate performance measures such as the connection time (the time duration a connection has been open), amount of data bytes transferred in the forward direction, amount of data bytes transferred in the reverse direction, and the idle time (when there is no data in the forward or reverse direction). These can be collected at the channel resources 1405A–N, and periodically updated to the channel resource manager 1402. Additionally or alternatively, the connection for release may be selected based on a grade of service assigned to a user. The candidates with a low the grade of service may be selected for release in favor of candidates with a high grade of service.

An HDR subscriber station, referred to herein as an access terminal (AT), may be mobile or stationary, and may communicate with one or more HDR base stations. An access terminal transmits and receives data packets. An access network may transport data packets between multiple access terminals. The access network may be further connected to additional networks outside the access network, such as a corporate intranet or the Internet, and may transport data packets between each access terminal and outside networks. An access terminal may be any data device that communicates through a wireless channel or through a wired channel, for example using fiber optic or coaxial cables. An access terminal may further be any of a number of types of devices including PC card, compact flash, external or internal modem, or wireless or wireline phone.

Those of skill in the art would appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a department from the scope of the present invention.

The various illustrative logical blocks, modules, and circuits described, in connection with the embodiments disclosed herein, may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method comprising:
   detecting a request for opening a new connection between an access terminal and a data network for communication of data;
   in response to the detected request, determining whether an access network between the access terminal and the data network has an overload condition;
   if the access network has the overload condition, determining whether there are any pre-existing idle open connections in the access network, each idle open connecting having assigned communication resources;
   selecting one of the pre-existing idle open connections based on at least (a) open connection times and (b) previous data traffic activity of the pre-existing idle open connections;
   releasing said selected pre-existing idle open connection; and
   allocating, to said new connection, communication resources corresponding to said released, selected pre-existing idle open connection.

2. The method of claim 1 wherein determining the overload condition comprises at least one of (a) determining whether communication resources in the access network are limited, (b) determining whether a pre-configured number of maximum connections per channel has been reached, and (c) determining whether a reverse link loading threshold has been exceeded.

3. The method of claim 1 wherein selecting one of the pre-existing idle open connections comprises:
   comparing idle open connection times of two or more idle open connections; and
   selecting an idle open connection, from said two or more idle open connections, with a longest idle open state connection time.

4. The method of claim 1 wherein selecting one of the pre-existing idle open connections comprises:
   comparing amounts of data previously transferred by the idle open connections when the idle open connections were in busy open states; and
   determining which idle open connection previously transferred a predetermined amount of data in a predetermined period of time.

5. The method of claim 4 wherein said predetermined amount of data is a largest amount of data transferred.

6. The method of claim 1 wherein selecting one of the pre-existing idle open connections comprises:
   comparing data transfer rates of the idle open connections when the idle open connections were in busy open states; and
   determining which idle open connection transferred data at a predetermined data rate in a predetermined period of time.

7. The method of claim 6 wherein said predetermined data rate is a highest data rate.

8. The method of claim 6 wherein said predetermined period is a period when the idle open connections were in busy open states.

9. The method of claim 1 wherein selecting one of the pre-existing idle open connections is further based on a random selection.

10. The method of claim 1, wherein selecting one of the pre-existing idle open connections comprises:
    comparing total idle open and busy open connection times of two or more idle open connections; and
    determining which idle open connection has a longest combined idle open state connection time and busy open state connection time.

11. The method of claim 1, if there are no idle open connections, further comprising:
    determining whether an open connection is in a busy open state; and
    releasing the busy open connection.

12. The method of claim 1, if there are no idle open connections, further comprising:
    determining whether two or more open connections are in a busy open state;
    determining which busy open connection has a longest busy open state connection time; and releasing the busy open connection with said longest busy open state connection time.

13. The method of claim 1, if there are no idle open connections, further comprising:
    determining whether two or more open connections are in a busy open state;
    determining which busy open connection transferred a predetermined amount of data in a predetermined period of time; and
    releasing the busy open connection used to transfer said predetermined amount of data in said predetermined period of time.

14. The method of claim 13 wherein said predetermined amount of data is a largest amount of data transferred.

15. The method of claim 13 wherein said predetermined period is a period when the open connections are in said busy open state.

16. The method of claim 1, if there are no idle open connections, further comprising:
    determining whether two or more open connections are in a busy open state;
    determining which busy open connection transferred data at a predetermined data rate in a predetermined period of time; and
    releasing the busy open connection used to transfer data at said predetermined data rate in said predetermined period of time.

17. The method of claim 16 wherein said predetermined data rate is a highest data rate.

18. The method of claim 1, if there are no idle open connections, further comprising:
    determining whether two or more open connections are in a busy open state;
    determining which busy open connection has a longest combined idle open state connection time and busy open state connection time.

19. The method of claim 1 further comprising:
    determining at least an open connection in a busy open state and at least an open connection in an idle open state; and
    selecting one of the open connections to release.

20. The method of claim 19 wherein said open connections include two or more open connections in said busy open state and two or more open connections in said idle open state, further comprising:
    determining which open connection has a longest idle open state connection time; and
    releasing the open connection with said longest idle open state connection time.

21. The method of claim 19 wherein said open connections include two or more open connections in said busy open state and two or more open connections in said idle open state, further comprising:
    determining which open connection has a longest busy open state connection time; and
    releasing the open connection with said longest busy open state connection time.

22. The method of claim 19 wherein said open connections include two or more open connections in said busy open state and two or more open connections in said idle open state, further comprising:
    determining which open connection transferred a predetermined amount of data in a predetermined period of time; and
    releasing said determined open connection used to transfer said predetermined amount of data in said predetermined period of time.

23. The method of claim 22 wherein said predetermined amount of data is a largest amount of data transferred.

24. The method of claim 19 wherein said open connections include two or more open connections in said busy open state and two or more open connections in said idle open state, further comprising:
    determining which open connection transferred data at a predetermined data rate in a predetermined period of time; and
    releasing said determined open connection used to transfer data at said predetermined data rate in said predetermined period of time.

25. The method of claim 24 wherein said predetermined data rate is a highest data rate.

26. The method as recited in claim 19 wherein said open connections include two or more open connections in said busy open state and two or more open connections in said idle open state, further comprising:
    determining which open connection has a longest combined idle open state connection time and busy open state connection time; and
    releasing the determined connection with said longest combined idle open state connection time and busy open state connection time.

27. The method of claim 1 wherein said determining whether the access network has an overload condition includes:
    detecting a predetermined number of existing connections; wherein said overload condition is based on said number of existing connections.

28. The method of claim 1 further comprising:
    monitoring utilization and activity of a reverse link; wherein said overload condition is based on a level of said utilization and activity.

29. An apparatus comprising:
    a resource manager for managing a plurality of communication resources in an access network between an access terminal and a data network; and
    a plurality of connection controllers in communication with said resource manager for making requests for allocating communication resources to a new connection;
    wherein said resource manager is configured to detect a request for opening a new connection for communication of data between the access terminal and the data network, to determine whether the access network has an overload condition, to determine whether there are any pre-existing open connections in the access network, each idle open connection having assigned communication resources, to select one of the pre-existing idle open connections based on at least (a) open connection times and (b) previous data traffic activity of the idle open connections, and to release said selected open connection for allocating, to said new connection, communication resources corresponding to said released, selected open connection.

30. The apparatus of claim 29 wherein to determine the overload condition comprises at least one of (a) to determine whether communication resources in the access network are limited, (b) to determine whether a pre-configured number of maximum connections per channel has been reached, and (c) to determine whether a reverse link loading threshold has been exceeded.

31. A method comprising:
    detecting a request for opening a new connection between an access terminal and a data network for communication of data;

selecting a pre-existing idle open connection in an access network between the access terminal and the data network based on a grade of service assigned to said pre-existing open connection and data traffic activity of the pre-existing open connection;

releasing said selected open connection; and allocating, to said new connection, communication resources corresponding to said released, selected open connection.

32. In a communication system for communication of data, a method comprising:

detecting a request for opening a connection for a user for communication of data;

selecting two or more open connections based on a grade of service assigned to said open connections;

determining whether two or more of the selected open connections are in an idle open state;

selecting an idle open connection, from said two or more selected open connections in said idle open state, with a longest idle open state connection time;

releasing said selected idle open connection; and allocating, to said user, communication resources corresponding to resources released based on said releasing said selected idle open connection.

33. In a communication system for communication of data, a method comprising:

detecting a request for opening a connection for a user for communication of data;

selecting two or more open connection based on a grade of service assigned to said open connections;

determining whether two or more of the selected open connections are in an idle open state;

selecting an idle open connection, from said two or more selected open connections in said idle open state, used to transfer a predetermined amount of data in a predetermined period of time;

releasing said selected idle open connection; and allocating, to said user, communication resources corresponding to resources released based on said releasing said selected idle open connection.

34. The method of claim 1, wherein the access network is a code division multiple access (CDMA) network configured to communicate wirelessly with the access terminal.

* * * * *